C. E. RANCILLAZ.
LOCKING DEVICE FOR NUTS AND THE LIKE.
APPLICATION FILED MAR. 14, 1908.

918,367.

Patented Apr. 13, 1909.

WITNESSES:
W. M. Avery
Walton Harrison

INVENTOR
Claude Ennemond Rancillaz
BY
Munn & Co
ATTORNEYS

UNITED STATES PATENT OFFICE.

CLAUDE ENNEMOND RANCILLAZ, OF COLOMBES, FRANCE.

LOCKING DEVICE FOR NUTS AND THE LIKE.

No. 918,367.
Specification of Letters Patent.
Patented April 13, 1909.

Application filed March 14, 1908. Serial No. 421,001.

*To all whom it may concern:*

Be it known that I, CLAUDE ENNEMOND RANCILLAZ, a citizen of the French Republic, residing at 15 Rue des Cerisiers, Colombes, Seine, France, engineer, have invented certain new and useful Improvements in Locking Devices for Nuts and the Like, of which the following is a specification.

My invention relates to a device for locking nuts and the like, by means of an intermediate part or washer which forms a connection between the nut and the screw threaded rod. In the devices of this kind as heretofore used, this intermediate part is not immovably fixed to the nut, until after the nut has been tightened up, this fixing of the nut to the washer being effected by the deformation of a collar on the nut or on the washer, produced by a tool or some external means.

The present invention has for its object a construction serving the same purpose, by permanently fixing the nut to the intermediate washer before placing in position, to avoid the risk of losing this part and to effect automatically the deformation which insures the fixing of the nut without using tools or other external means.

Reference is to be had to the accompanying drawings forming a part of this specification, in which similar characters of reference indicate corresponding parts in all the figures.

Figure 1:
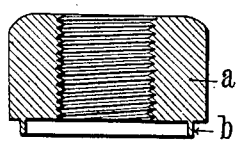
Figure 2:
Figure 3:
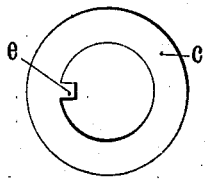
Figure 4:
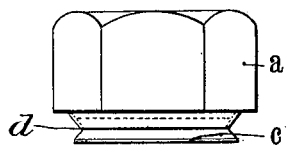
Figure 5:
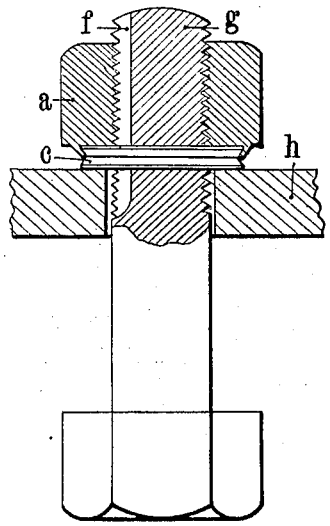

Figure 1 is a central vertical section through the nut which is provided with a flange to be bent inwardly for the purpose of securing a washer thereto; Fig. 2 is an elevation of the washer which is to be loosely secured upon the nut by aid of the above-mentioned flange; Fig. 3 is a plan view of the washer shown in Fig. 2; Fig. 4 is an elevation showing the nut with the washer attached thereto by aid of the flange upon the nut, the nut, however, being free to turn relatively to the washer; Fig. 5 is a section showing the nut as secured upon a bolt, and the washer encircling the bolt and connected with the nut.

One of the plane faces of the nut $a$ carries a circular collar $b$ sufficiently thin to be deformed by pressure or closing-over. The washer $c$ (Fig. 3) is recessed on its outer edge with a channel $d$ (Fig. 2) of angular section; its central recess is provided with a stud $e$ intended to engage in the longitudinal groove $f$ in the bolt $g$ (Fig. 5).

The nut $a$ is permanently fixed to the washer $c$ in the sense that when the washer $c$ is fitted into the flange, $b$, and the flange is cupped inwardly, as shown in Fig. 5, the washer and the nut cannot be separated from each other, and present the appearance indicated in Fig. 4. In this case however, the nut may be turned relatively to the washer and vice versa, the parts being practically swiveled to each other. The locking of the device is obtained by screwing the nut tight on the washer, the lower rim of the collar $b$ being thus jammed against the groove $d$ of the washer $c$; said collar is therefore still further bent over, which causes the supplementary closing over referred to above. The jam of the collar against the washer secures the nut immovably to said collar, and prevents it from unscrewing. In this manner, the part $h$ is held to the washer $c$ and the bolt $g$. With this object the washer $c$ is arranged in the cup formed by the circular collar $b$ and then this flange is closed over on the latter into the annular groove $d$ in the washer, the pressure being regulated in such a manner as to permit the washer to turn freely but with friction. In this manner the arrangement represented in Fig. 4 is obtained.

In order to use this device the nut $a$ is placed on the bolt (Fig. 5) the washer being underneath; the stud $e$ on the washer is engaged in the groove $f$ in the bolt and the nut is tightened in the ordinary manner.

Without rotation the washer slides along the bolt and when the nut and its washer reach their assigned position the latter rests upon the part $h$ to be held. When the nut $a$ is screwed tight on the washer $c$, then the rim of its collar $b$ is pressed against the groove $d$, in any suitable manner, thus firmly securing the nut to the washer. Obviously the more the nut is tightened the stronger will be the connection between nut and washer.

The part $h$ to be held being thus connected with two parts (bolt $g$ and washer $c$) incapable of turning one without the other, the nut cannot unscrew even as a result of vibration.

The advantages are as follows:—This nut firmly fixed to its washer may be arranged in position without any accessory operation, the placing in position and the displacement can be effected as rapidly as with an ordinary nut. The washer having been permanently fixed to the nut before it is placed upon the bolt, it is impossible to lose it. Finally owing to the fact that the supplementary closing-over, which takes place upon screwing the nut tight, is automatic, it is not necessary to have recourse to tools or other external means for producing the deformation of the collar of the nut which insures the fixing of the latter.

It will of course be understood that the washer and its groove may be given any appropriate forms by which the connection with the nut in the conditions set forth is obtained.

The arrangement represented might equally well be inverted; that is to say, the washer might be provided with a flange enveloping the collar *b* of the nut and adapted to be closed-over into an appropriate groove in the latter.

The invention is applicable in a general way in all cases in which it is desired to effect safety locking rapidly; for example when it is necessary to change a pneumatic tire on a detachable rim on the road and in a minimum of time.

Having now particularly described and ascertained the nature of my said invention and in what manner the same is to be performed, I declare that what I claim is:—

The combination of a threaded bolt provided with a groove, a threaded nut mounted upon said bolt and movable relatively thereto, said nut being provided with a flange, and a washer provided with an annular groove, said flange of said nut being bent into said groove so as to hold said nut and said washer permanently but loosely together, said washer being provided with a portion projecting into said groove of said bolt for the purpose of preventing said washer from turning.

In testimony whereof I have hereunto placed my hand, at Paris this 29th day of February 1908.

CLAUDE ENNEMOND RANCILLAZ.

In the presence of two witnesses:
ALBERT NUNÈS,
LOUIS COQUILLER.